(12) United States Patent
Kim (10) Patent No.: US 9,397,323 B2
(45) Date of Patent: Jul. 19, 2016

(54) CYLINDER TYPE SECONDARY BATTERY

(75) Inventor: Daekyu Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 2095 days.

(21) Appl. No.: 12/389,982

(22) Filed: Feb. 20, 2009

(65) Prior Publication Data

US 2009/0233157 A1    Sep. 17, 2009

(30) Foreign Application Priority Data

Mar. 17, 2008    (KR) ........................ 10-2008-0024424

(51) Int. Cl.
*H01M 2/00* (2006.01)
*H01M 2/04* (2006.01)
*H01M 2/34* (2006.01)
*H01M 2/12* (2006.01)

(52) U.S. Cl.
CPC .......... *H01M 2/0413* (2013.01); *H01M 2/1235* (2013.01); *H01M 2/345* (2013.01); *H01M 2/12* (2013.01); *H01M 2/1229* (2013.01); *H01M 2200/20* (2013.01)

(58) Field of Classification Search
CPC .............................. H01M 2/12; H01M 2/1229
USPC ....................................................... 429/163
See application file for complete search history.

(56) References Cited

U.S. PATENT DOCUMENTS

| | | | |
|---|---|---|---|
| 4,662,533 A | 5/1987 | Takahashi et al. | |
| 5,707,756 A | 1/1998 | Inoue et al. | |
| 6,207,320 B1 | 3/2001 | Song et al. | |
| 2002/0012836 A1 | 1/2002 | Segawa et al. | |
| 2007/0009785 A1 | 1/2007 | Kozuki et al. | |
| 2007/0172728 A1* | 7/2007 | Yamashita et al. | 429/174 |
| 2007/0212595 A1 | 9/2007 | Kim et al. | |

FOREIGN PATENT DOCUMENTS

| | | |
|---|---|---|
| EP | 1 184 915 | 3/2002 |
| JP | 07-235288 (A) | 9/1995 |
| JP | 2000-048779 (A) | 2/2000 |
| JP | 2001-229903 (A) | 8/2001 |
| JP | 2004-030357 (A) | 1/2004 |
| JP | 2007-018962 (A) | 1/2007 |
| JP | 2007-273359 | 10/2007 |
| KR | 10-1997-0031053 | 6/1997 |

(Continued)

OTHER PUBLICATIONS

English-language abstract of KR 10-2007-0088897.

(Continued)

*Primary Examiner* — Jane Rhee
(74) *Attorney, Agent, or Firm* — Knobbe, Martens, Olson & Bear, LLP (57) ABSTRACT

Disclosed is a cylindrical secondary battery that can improve pressing force of a gasket pressing a cap up and a safety vent. The cylindrical secondary battery prevents leakage of electrolyte by improving pressing force of the gasket by including a cap up whose terminal portion is formed thicker than the peripheral portion. By using the cap up of the above structure, a curled portion is formed at the edge of the cap up or safety vent so as to surround the end of the safety vent or cap up. Thus, internal resistance can be reduced when the vibration or external impact is applied to the battery, and assembling error can be prevented.

19 Claims, 4 Drawing Sheets

(56) References Cited

FOREIGN PATENT DOCUMENTS

| KR | 20-0218369 | 4/2001 |
|----|------------|--------|
| KR | 10-2007-0093171 | 9/2007 |
| KR | 10-0795680 | 1/2008 |
| KR | 10-0878701 | 1/2009 |

OTHER PUBLICATIONS

English-language abstract of KR 10-2007-0093171.
Japanese Office Action dated Jun. 5, 2012 corresponding to Korean Patent Application No. KR 10-2008-0024424 which corresponds to captioned U.S. Appl. No. 12/389,982.

\* cited by examiner

CYLINDER TYPE SECONDARY BATTERY

CROSS-REFERENCE TO RELATED APPLICATION

This application is based on, and claims priority to, Korean Patent Application No. 2008-24424, filed on Mar. 17, 2008, in the Korean Intellectual Property Office (KIPO), the disclosure of which is incorporated herein, by reference.

BACKGROUND OF THE INVENTION

1. Field of the Invention

Aspects of the present invention relate to a cylindrical secondary battery, and more particularly, to a cylindrical secondary battery including a gasket that improves the coupling of a cap up and a safety vent.

2. Description of the Related Art

Generally, a secondary battery can be classified as cylindrical, rectangular, or pouch-type, according to a shape of a case of the battery.

In a cylindrical secondary battery, an electrode assembly is inserted into a cylindrical can, and then a cap assembly is assembled to an upper opening of the cylindrical can. The cap assembly is electrically coupled to the electrode assembly, to transmit current to an external device.

The cap assembly improves the stability of the battery, by reducing an internal pressure of the can, or by interrupting current flow. The internal pressure can be increased by overcharging, or an abnormal operation of, the battery, which can cause an explosion.

The cap assembly includes a cap up (cathode terminal), and a safety vent that is provided under the cap up. The safety vent is deformed to interrupt current, or to discharge gas to relieve the increased internal pressure. A cap down and a sub-plate are sequentially provided under the safety vent, and are connected to a cathode of the electrode assembly.

Vibrations or external impacts applied to a cylindrical battery can result in an unwanted increase in the resistance of contact surfaces between components of the cap assembly. Particularly, battery performance is degraded, when the contact resistance, of an interfacial surface between the safety vent and cap up, is increased.

To solve the above problem, the contact surfaces of the safety vent and cap up can be welded, or the safety vent can be bent, to surround an outer surface of the cap up. However, the welding complicates an assembling process of a battery, and defects can occur, when the welding is not properly performed.

In addition, it is difficult to bend the safety vent, so as to surround the outer circumference surface of the cap up, because thickness of the cap up is increased in high-capacity secondary batteries. In addition, in high capacity secondary batteries, the pressing force of a gasket is reduced, because of the larger thickness of the stacked portions of the cap up and the safety vent.

SUMMARY OF THE INVENTION

An aspect of the present invention is to provide a cylindrical secondary battery that can prevent the leakage of an electrolyte, by improving the pressing force applied by a gasket to the outer surface of a cap assembly, by providing a cap up and a safety vent that have reduced thicknesses.

Another aspect of the present invention is to provide a cylindrical secondary battery that can prevent internal resistances of the cap up and safety vent from being increased, by vibrations or external impacts.

Another aspect of the present invention is to provide a cylindrical secondary battery that can prevent assembly errors, by precisely assembling the cap up and safety vent.

A further still another aspect of the present invention is to provide a cylindrical secondary battery that can improve assembling workability, by facilitating a curling process to combine the cap up and the safety vent.

According to one aspect of the present invention, there is provided a cylindrical secondary battery that comprises: a cylindrical can; an electrode assembly received in the cylindrical can; and a cap assembly including a safety vent, electrically coupled to the electrode assembly, and a cap up provided over the safety vent. The safety vent interrupts current, and discharges internal gas from the battery when internal pressure of the battery is increased. A thickness of the terminal portion of the cap up is different from that of a peripheral portion thereof.

According to aspects of the present invention, the peripheral portion of the cap up may be thinner than the terminal portion thereof.

According to aspects of the present invention, the terminal portion of the cap up may be outwardly projected, and the peripheral portion may be flat and extend outward from the terminal portion.

According to aspects of the present invention, the cap up may include a curled portion that extends from an edge of the peripheral portion, to surround an end of the safety vent.

According to aspects of the present invention, a thickness (T) of the curled portion is not more than the sum of a thickness (t1) of the terminal portion of the cap up, and a thickness (t3) of the safety vent.

According to aspects of the present invention, the thickness (t1) of the terminal portion of the cap up may be more than twice of the thickness (t2) of the peripheral portion.

According to aspects of the present invention, the thickness (t3) of the safety vent may be the same as the thickness (t2) of the peripheral portion.

According to aspects of the present invention, the thickness (t1) of the terminal portion of the cap up may be more than 0.6 mm, and the thickness (t3) of the safety vent may be 0.3 mm.

According to aspects of the present invention, the radial thickness (r2) of the peripheral portion of the cap up may be 10 to 40% of the radial thickness (r1) of the cap up.

According to aspects of the present invention, the radial thickness (r3) of the curled portion of the cap up may be less than the radial thickness (r2) of the peripheral portion.

According to aspects of the present invention, the safety vent may include a curled portion that is extended from an edge thereof, to surround an end of the cap up.

According to aspects of the present invention, a thickness (T') is not more than the sum of a thickness (t1') of the terminal portion of the cap up and a thickness (t3') of the safety vent, where the thickness (T') is a thickness of a portion where the end of the cap up is surrounded by the curled portion of the safety vent.

According to aspects of the present invention, the thickness (t1') of the terminal portion of the cap up may be more than twice of the thickness (t2') of the peripheral portion thereof.

According to aspects of the present invention, the thickness (t3') of the safety vent may be the same as the thickness (t2') of the peripheral portion of the cap up.

According to aspects of the present invention, the thickness (t1') of the terminal portion of the cap up may be more than 0.6 mm, and the thickness (t3') of the safety vent may be 0.3 mm.

According to aspects of the present invention, the radial thickness (r2) of the peripheral portion of the cap up may be 10 to 40% of the radial thickness (r1) of the cap up.

According to aspects of the present invention, the radial thickness (r3') of the curled portion of the safety vent may be less than the radial thickness (r2) of the peripheral portion.

Additional aspects and/or advantages of the invention will be set forth in part in the description which follows, and in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION OF THE EMBODIMENTS

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

Figure 1:
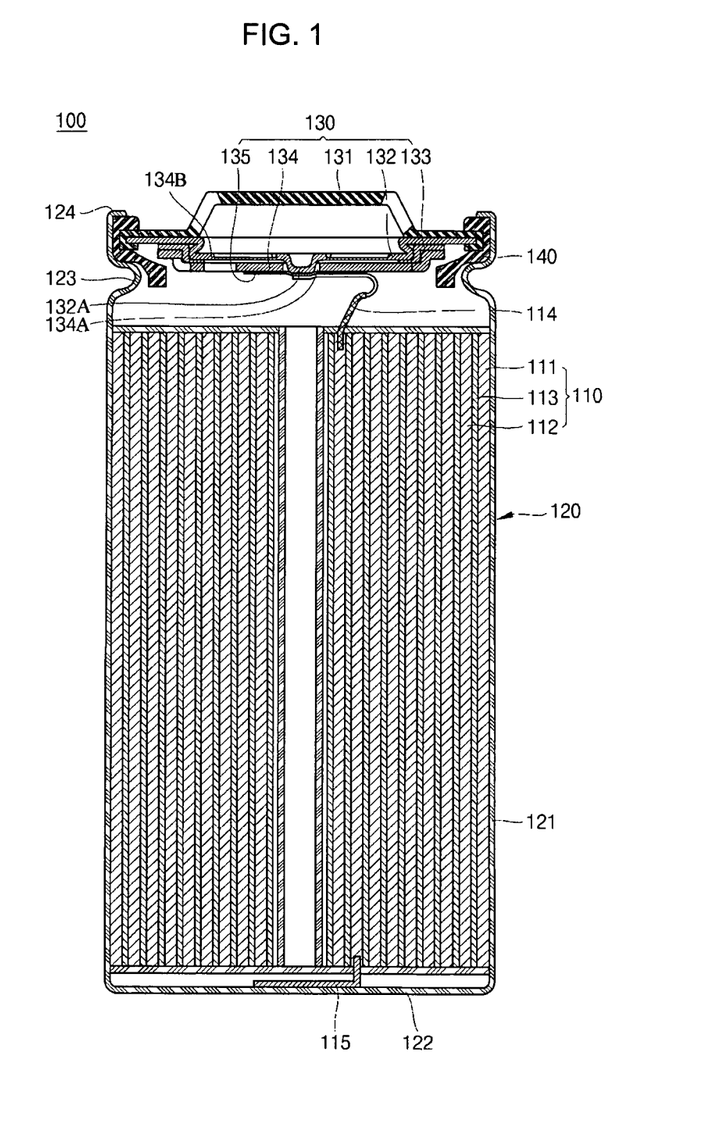
FIG. 1 is a vertical sectional view illustrating a cylindrical secondary battery, according to one exemplary embodiment of the present invention.
Figure 2:
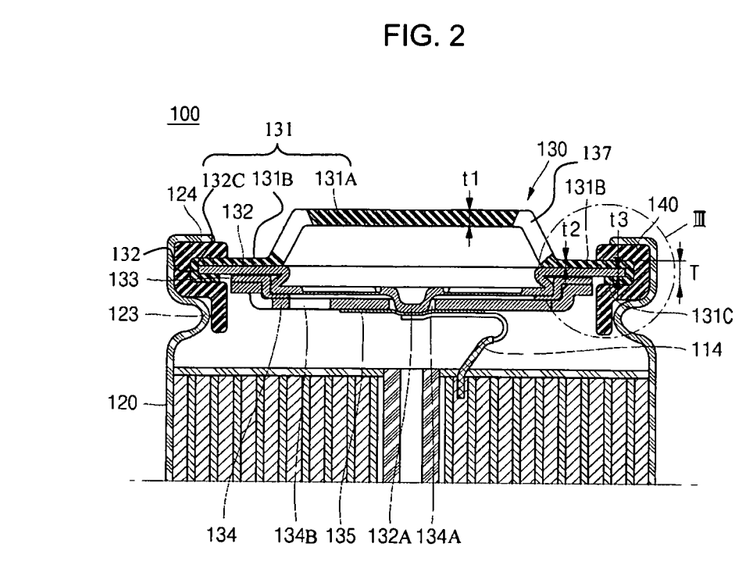
FIG. 2 is a magnified sectional view illustrating a cap assembly of FIG. 1.
Figure 3:
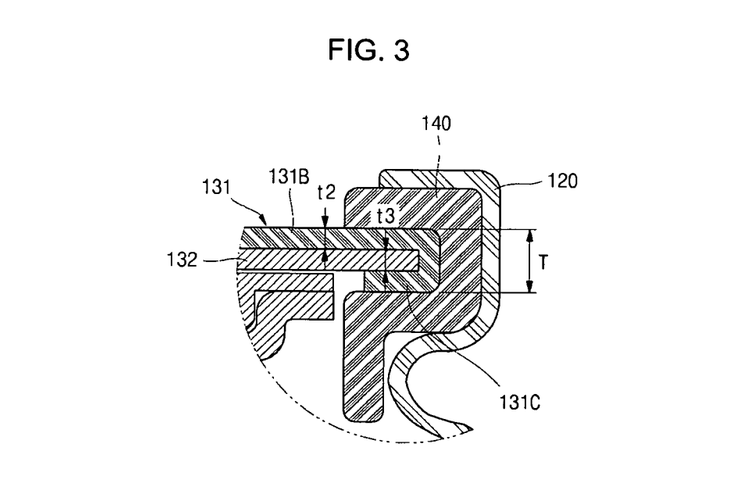
FIG. 3 is a magnified view illustrating part 'III' of FIG. 2.
Figure 4:
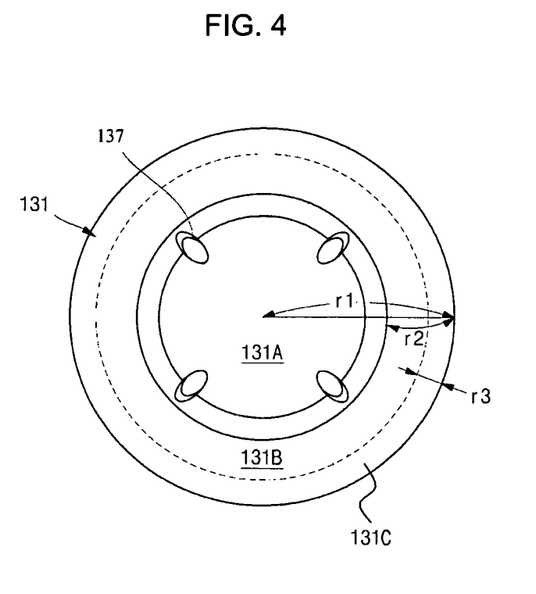
FIG. 4 is a plan view illustrating a cap up of the cylindrical secondary battery.

FIG. 1 is a vertical sectional view illustrating a cylindrical secondary battery 100, according to one exemplary embodiment of the present invention, and FIG. 2 is a magnified sectional view illustrating a cap assembly of FIG. 1. FIG. 3 is a magnified view illustrating part 'III' of FIG. 2, and FIG. 4 is a plan view illustrating a cap up of the cylindrical secondary battery 100.

Referring to FIGS. 1 to 4, the secondary battery 100 includes an electrode assembly 110, a cylindrical can 120 to house the electrode assembly 110, a cap assembly 130 combined to an upper opening of the cylindrical can 120, and a gasket 140 provided on an inner circumference of the upper opening of the cylindrical can 120.

Middle and peripheral portions of a cap up 131 of the cap assembly 130 have different thicknesses. In other words, the peripheral portion of the cap up 131 is thinner than the terminal portion.

The electrode assembly 110 is formed by winding a cathode plate 111, an anode plate 112, and a separator 113 in a jelly-roll shape. The cathode plate 111 includes a cathode active material layer coated on a cathode collector, and the anode plate 112 includes an anode active material layer coated on an anode collector. The separator 113 is interposed between the cathode and anode plates 111 and 112, to insulate them electrically from each other. At an upper part of the electrode assembly 110, a cathode tab 114 is connected to the cap assembly 130, and at a lower part of the electrode assembly 110, an anode tab 115 is connected to a bottom surface of the cylindrical can 120.

The cathode collector of the cathode plate 111 is made of a conductive metal, to collect electrons from the cathode active material layer, and to transfer the electrons to an external circuit. The cathode active material layer is formed by mixing a cathode active material, a conductive material, and a binder, and coating the mixture on the cathode collector. Cathode uncoated parts are formed on both ends of the cathode plate, where the cathode active material layer is not coated. The cathode tab 114 is welded to one of the cathode uncoated parts.

The anode collector of the anode plate 112 is made of a conductive metal, to collect electrons from the anode active material layer, and to transfer the electrons to the external circuit. The anode active material layer is formed by mixing an anode active material, a conductive material, and a binder, and coating the mixture on the anode collector. Anode uncoated parts are formed on both ends of the anode plate, where the anode active material layer is not coated. The anode tab 115 is welded to one of the anode uncoated parts.

The separator 113 is interposed between the cathode and anode plates 111 and 112, and may be extended to surround an outer circumference surface of the electrode assembly 110. The separator 113 prevents a short between the cathode and anode plates 111 and 112. The separator 113 is made of porous polymer that lithium ions can pass through.

The cylindrical can 120 includes a side plate 121 to form a space to receive the electrode assembly 110, and a lower plate 122 to seal a lower part of the side plate 121. The cylindrical can 120 is usually made of a lightweight conductive metal, such as aluminum, or an aluminum alloy, and is generally formed by a deep drawing method. The upper opening of the cylindrical can 120 is sealed, after the electrode assembly 110 is inserted. In addition, a beading part 123 is formed at an upper part of the cylindrical can 120, to secure the electrode assembly 110. A crimping part 124 is formed at the uppermost part of the cylindrical can 120, to fix the cap assembly 130.

The cap assembly 130 includes a cap up 131, a safety vent 132, a cap down 134, an insulator 133, and a sub-plate 135. The cap up 131 is electrically coupled to the electrode assembly 110, and transmits current generated in the electrode assembly 110 to an external device. The safety vent 132 contacts a lower surface of the cap up 131, interrupts current, and discharges internal gas when abnormal internal pressure is generated in the cylindrical can 120. The cap down 134 is provided below the safety vent 132, to seal the cylindrical can 120. The insulator 133 is interposed between the safety vent 132 and cap down 134. The sub-plate 135 is fixed to a lower surface of the cap down 134, and the cathode tab 114 is attached to the sub-plate 135.

The cap up 131 can be a circular plate. The cap up 131 includes: a terminal portion 131A that is electrically coupled to the external device, and which projects from the center of the cap up 131; a peripheral portion 131B that extends radially from the terminal portion 131A; and a curled portion 131C that is bent from the peripheral portion 131B, and extends around an edge of the safety vent 132. Several gas discharge holes 137 are formed on an outer edge of the terminal portion 131A, to discharge gas generated inside the cylindrical can 120.

The thickness (t2), of a peripheral portion 131B of the cap up 131, is less than the thickness (t1) of the terminal portion 131A. The thickness (t1) of the terminal portion 131A may be at least twice the thickness (t2) of the peripheral portion 131B (t1≥2t2).

The safety vent 132 can be a circular plate corresponding to the cap up 131. The safety vent 132 includes a terminal portion 132A that extends toward the electrode assembly 120. The thickness (t3) of the safety vent 132 is generally the same as the thickness (t2) of the peripheral portion 131B of the cap up 131 (t2=t3). The cap up 131 and safety vent 132 are combined prior to the combination of other components of the cap assembly 130.

The thickness (T) of the curled portion 131C is equal to twice the thickness (t2) of the peripheral portion 131B, and to the thickness (t3) of the safety vent 132 (T=2t2+t3). In other words, the thickness (T) is not more than the sum of the thickness (t1) of the terminal portion 131A of the cap up 131, and the thickness (t3) of the safety vent 132 (T≤t1+t3).

Once combined, the cap up 131 and safety vent 132 are seated inside of a gasket 140, at the upper opening of the cylindrical can 120, and assembled by pressing the gasket 140 against the curled portion 131C of the cap up 131. The insulator 133 is interposed between the safety vent 132 and the cap down 134. The insulator 133 insulates the safety vent 132 from the cap down 134.

The cap down 134 can be a circular plate. A through-hole 134A is formed in the middle of the cap down 134. The terminal portion 132A of the safety vent 132 passes through the through-hole 134A. A gas discharge hole 134B is formed at one side of the cap down 134. When the internal pressure is excessively increased, gas is discharged through the gas discharge hole 134B, past the terminal portion 132A.

The sub-plate 135 is welded to the terminal portion 132A of the safety vent 132, to electrically couple the cathode tab 114 to the safety vent 132. A PTC (Positive Temperature Coefficient) device may be further provided between the cap up 131 and safety vent 132, as a secondary protective device.

Generally, in a high capacity cylindrical secondary battery, the cap up has a thickness of more than 0.6 mm, so as to endure a vibration safety test. Accordingly, in the cylindrical secondary battery 100, the thickness (t1) of the terminal part 131A of the cap up 131 is 0.6 mm, and the thickness (t2) of the peripheral portion 131B of the cap up 131 is 0.3 mm, for example.

The peripheral portion 131B of the cap up 131 is bent to form the curled portion 131C. The thickness (t2) of the peripheral portion 131B is 0.3 mm. The thickness (t3) of the safety vent 132 is 0.3 mm. Thus, the thickness (T) of the curled portion is 0.9 mm (twice the thickness of the peripheral portion 131B, plus the thickness of the safety vent 132). In comparison, in the conventional secondary battery, the combined thickness of the cap up (0.6 mm) and the of the safety vent (0.3 mm) is also 0.9 mm. Thus, pressing force exerted by the gasket 140 onto the outer circumference surfaces of the cap up 131 and safety vent 132, is not decreased.

When the thickness (t2) of the peripheral portion 131B of the cap up 131 is not reduced, as compared to the conventional art, and the curled portion 131C is curled around the safety vent 132, the thickness (T) of the curled portion 131C becomes 1.5 mm, because twice the thickness of the curled portion 131C is 0.6 mm, and the thickness of the safety vent is 0.3 mm. Accordingly, the pressing force exerted by the gasket to the curled portion 131C is decreased.

The radial thickness (r2) of the peripheral portion 131B of the cap up 131 is generally within 10% to 40% of the radial thickness (r1) of the entire cap up 131. It is difficult to secure the thickness (T) of the curled portion 131C, when the radial thickness (r2) of the peripheral portion 131B is less than 10% of the radial thickness (r1) of the cap up 131. When the radial thickness (r2) of the peripheral portion 131B of the cap up 131 is more than 40% of the radial thickness (r1) of the cap up 131, the cap up 131 may not be strong enough to pass the vibration safety test.

The radial thickness (r3) of the curled portion 131C is less than the radial thickness (r2) of the peripheral portion 131B. The curled portion 131C should have a length sufficient to surround the end of the safety vent 132, and to prevent leakage of an electrolyte.

The secondary battery 100 is assembled by inserting the electrode assembly 110 into the cylindrical can 120, injecting an electrolyte, and sealing the upper opening of the cylindrical can 120 with the cap assembly 130. The cap up 131 and the safety vent 132 are assembled prior to disposing the cap assembly in the can 120. During the assembly, the curled portion 131C is curled around the edge of the safety vent 132, through a curling process.

The curling process involves bending a plate material. By the curling process, the end of the safety vent 132 is surrounded by the peripheral edge (curled portion 131C) of the cap up 131, such that the curled portion 131C is pressed against the outer edge of the safety vent 132.

The assembled cap up 131 and safety vent 132 are positioned on the cap down 134, with the insulator 133 interposed therebetween. The terminal portion 132A of the safety vent 132 is positioned to extend through the through-hole 134A. A sub-plate 135 is welded to the terminal portion 132A of the safety vent 132. The cap up 131 and safety vent 132 are always precisely positioned, because the cap up 131 and safety vent 132 are previously combined, and then positioned on the cap down 134, as described above. Thus, assembling errors can be prevented.

The beading part 123 is formed at the upper part of the cylindrical can 120, to prevent movement of the electrode assembly 110, after the electrode assembly 110 is inserted into the cylindrical can 120 and the electrolyte is injected. After the gasket 140 is inserted into the cylindrical can 120, and the cap assembly 130 is seated thereon, the upper end of the cylindrical can 120 is crimped.

During the crimping, the thickness (T) the curled portion 131C is 0.9 mm. Thus, the gasket 140 is pressed against the outer circumference surface of the cap up 131, with a predetermined pressing force.

Figure 5:
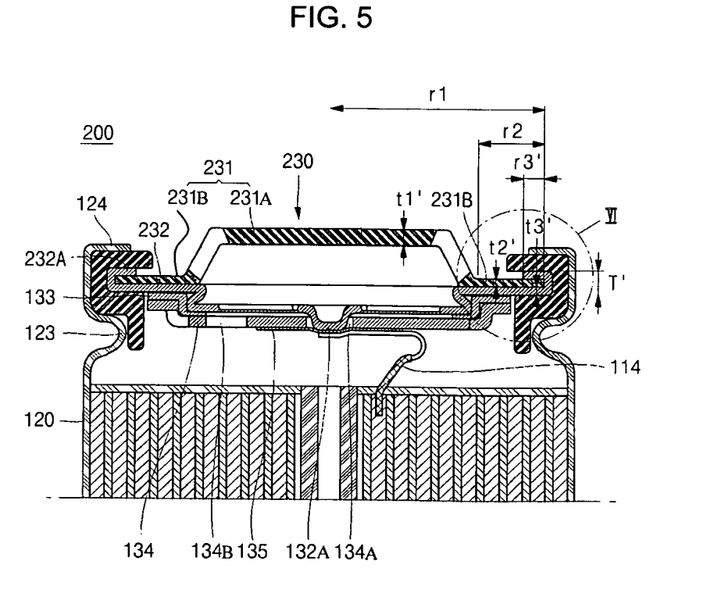
FIG. 5 is a sectional view illustrating a cap assembly of a cylindrical secondary battery, according to another exemplary embodiment of the present invention.
Figure 6:
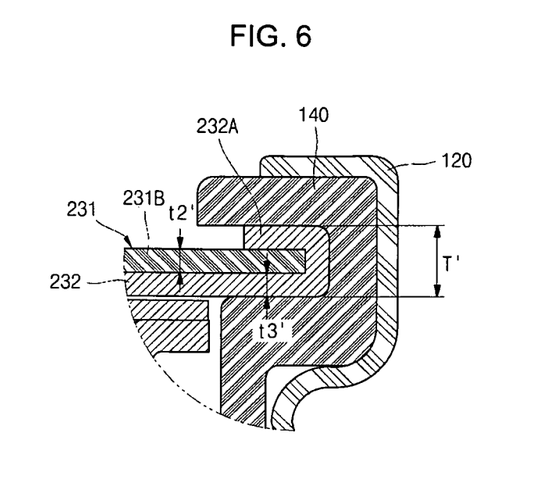
FIG. 6 is a magnified view illustrating part 'VI' of FIG. 5.

FIG. 5 is a sectional view illustrating a cap assembly 230 of a cylindrical secondary battery 200, according to another exemplary embodiment of the present invention, and FIG. 6 is a magnified view illustrating portion 'VI' of FIG. 5. Referring to FIGS. 5 and 6, the secondary battery 200 includes an electrode assembly 110, a cylindrical can 120 to house the electrode assembly 110, and the cap assembly 230, which is combined to an upper opening of the cylindrical can 120. The cap assembly 230 includes a cap up 231 and a safety vent 232. The cap up 231 is electrically coupled to the electrode assembly 110, and transmits current generated in the electrode assembly 110, to an external device. The safety vent 232 interrupts current, and discharges an internal gas, when abnormal internal pressure is generated in the cylindrical can 120.

The thickness (t2') of a peripheral portion 231B of the cap up 231 is less than the thickness (t1') of a terminal portion 231A of the cap up 231. In addition, the edge of the safety vent 232 is bent, to form a curled portion 232A that surrounds an edge of the peripheral portion 231B of the cap up 231.

Other elements of the electrode assembly 110, the cylindrical can 120, and the cap assembly 230 are similar to those described above. Thus, a detailed explanation thereof, is omitted.

The thickness (t1') of the terminal portion 231A of the cap up 231 is 0.6 mm, and the thickness (t2') of the peripheral portion 231B of the cap up 231 is 0.3 mm. The thickness of the safety vent 232 is 0.3 mm, and the thickness (t2') of the peripheral portion 231B of the cap up 231 is 0.3 mm.

Accordingly, the thickness (T') of the curled portion 232A is 0.9 mm. The thickness (T') of the curled portion 232A is the thickness of the safety vent 232, added to twice the thickness of the safety vent 232. In other words, the thickness (T') does not exceed the sum of the thickness (t1') of the terminal portion 231A of the cap up, and the thickness (t3') of the safety vent 232.

The thickness (T') is the same as the total thickness (0.9 mm) of the cap up and safety vent, in a conventional high capacity secondary battery. Thus, the pressing force applied by the gasket to the outer edge of the safety vent, is not decreased.

When the thickness of the peripheral portion of the cap up is not reduced, as compared to the conventional art, if the safety vent is bent around the cap up, the total thickness becomes 1.2 mm, because thickness of the cap up is 0.6 mm, and the thicknesses of the safety vent is 0.3 mm. Accordingly, a pressing force of the gasket 140 is decreased. In other words, if the sum of the thicknesses (T) and (T'), of the cap up 231 and safety vent 232, increases, the relative pressing force of the gasket 140 decreases.

The radial thickness (r2) of the peripheral portion 231B of the cap up 231 is within 10% to 40%, of the radial thickness (r1) of the entire safety vent 232. It is difficult to secure the thickness (T3') of the portion pressed by the gasket 140, after the edge of the peripheral portion 231B is surrounded by the curled portion 232A, when the radial thickness (r2) of the peripheral portion 231B is less than 10% of the radial thickness (r1) of the entire cap up 231. In addition, the strength of the cap up may not be sufficient to pass the vibration safety test, when the radial thickness (r2) of the peripheral portion 231B of the cap up 231 is more than 40% of the radial thickness (r1) of the entire cap up 231.

The radial thickness (r3') of the curled portion 232A of the safety vent 232 is generally less than the radial thickness (r2) of the peripheral portion 231B of the cap up 231. The radial thickness (r3') of the curled portion 232A is generally long enough for the curled portion 232A to surround the end of the peripheral portion 231B, so as to prevent leakage of the electrolyte.

An assembling process of the secondary battery 200 is substantially the same as described above, except that the curling process is performed, so as to surround the end of the cap up 231 with the safety vent 232, at the time of assembling the cap assembly 230. As described above, the cap up 231 and safety vent 232 are first integrated with each other, and the safety vent 232 is assembled over the cap down 134. Thus, the safety vent 232 is always precisely arranged, and assembling errors can be prevented.

The thickness (T') does not exceed the sum of the thickness (t1') of the terminal portion 231A, and the thickness (t3') of the safety vent 232. Thus, the gasket 140 is pressed against the outer circumference surface of the safety vent 232, with a predetermined pressing force.

As described above, a cylindrical secondary battery, according to aspects of the present invention, produces the following effects. First, the cap up of the cap assembly is thin, except for the area where the strength can be maintained. When the cap up surrounds the end of the safety vent, or the safety vent surrounds the end of the cap up, the sum of thicknesses of the cap up and safety vent does not exceed a predetermined thickness. Accordingly, the pressing force of the gasket against the cap up and safety vent is not decreased. Thus, leakage of the electrolyte is prevented between the cap assembly and gasket. In addition, the thickness of the stacked cap up and safety vent is decreased, and the curling process can be easily performed.

Second, the cap up and safety vent of the cap assembly are combined with each other, such that one part surrounds the end of the other part. Thus, battery performance is improved, by preventing an increase of internal resistance, due to vibrations or external impacts. Third, the cap cup and safety vent are preassembled. Thus, stable battery performance can be obtained, by assembling components at exact positions.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A cylindrical secondary battery, comprising:
   a cylindrical can;
   an electrode assembly housed in the can;
   a cap assembly comprising a safety vent electrically coupled to the electrode assembly, and a cap up disposed on the safety vent; and
   a gasket comprising three surfaces that at least partially surround the cap up and the safety vent,
   wherein the cap up comprises a terminal portion and a peripheral portion, and the safety vent interrupts current and discharges gas from the battery, when an internal pressure of the battery is increased,
   wherein the peripheral portion comprises a region surrounded by the three surfaces of the gasket, and wherein the region of the peripheral portion is thinner than the terminal portion of the cap up.

2. The cylindrical secondary battery of claim 1, wherein the terminal portion of the cap up projects away from the electrode assembly, and the peripheral portion extends away from the terminal portion.

3. The cylindrical secondary battery of claim 1, wherein the peripheral portion of the cap up is bent around an edge of the safety vent, to form a curled portion.

4. The cylindrical secondary battery of claim 3, wherein the thickness of the curled portion is not more than the sum of the thickness of the terminal portion, and the thickness of the safety vent.

5. The cylindrical secondary battery of claim 4, wherein the thickness of the terminal portion is at least twice the thickness of the peripheral portion.

6. The cylindrical secondary battery of claim 4, wherein the thickness of the safety vent is the same as the thickness of the peripheral portion.

7. The cylindrical secondary battery of claim 4, wherein the thickness of the terminal portion is 0.6 mm.

8. The cylindrical secondary battery of claim 4, wherein the thickness of the safety vent is 0.3 mm.

9. The cylindrical secondary battery of claim 3, wherein the radial thickness of the peripheral portion is within a range of 10% to 40% of the radial thickness of the cap up.

10. The cylindrical secondary battery of claim 9, wherein the radial thickness of the curled portion, prior to being curled, is less than the radial thickness of the peripheral portion.

11. The cylindrical secondary battery of claim 1, wherein the safety vent comprises a curled portion that extends around an end of the cap up.

12. The cylindrical secondary battery of claim 11, wherein the thickness of the curled portion is not more than the sum of the thickness of the terminal portion, and the thickness of the safety vent.

13. The cylindrical secondary battery of claim 12, wherein the thickness of the terminal portion is at least twice the thickness of the peripheral portion.

14. The cylindrical secondary battery of claim 12, wherein the thickness ($t3'$) of the safety vent is the same as the thickness of the peripheral portion.

15. The cylindrical secondary battery of claim 12, wherein the thickness ($t1'$) of the terminal portion is 0.6 mm.

16. The cylindrical secondary battery of claim 12, wherein the thickness of the safety vent is 0.3 mm.

17. The cylindrical secondary battery of claim 11, wherein the radial thickness of the peripheral portion is within a range of 10 to 40% of the radial thickness of the cap up.

18. The cylindrical secondary battery of claim 17, wherein the radial thickness of the curled portion, prior to being curled, is less than the radial thickness of the peripheral portion.

19. The cylindrical secondary battery of claim 1, wherein the peripheral portion has a substantially constant thickness.

* * * * *